(12) United States Patent
Hwang et al.

(10) Patent No.: US 9,317,782 B2
(45) Date of Patent: Apr. 19, 2016

(54) INCREMENTAL CATEGORY EMBEDDING FOR CATEGORIZATION

(71) Applicant: Disney Enterprises, Inc., Burbank, CA (US)

(72) Inventors: Sung Ju Hwang, Pittsbugh, PA (US); Leonid Sigal, Pittsburgh, PA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 14/485,537

(22) Filed: Sep. 12, 2014

(65) Prior Publication Data

US 2016/0078320 A1 Mar. 17, 2016

(51) Int. Cl.
| | |
|---|---|
| *G06K 9/00* | (2006.01) |
| *G06E 1/00* | (2006.01) |
| *G06K 9/62* | (2006.01) |
| *G06N 99/00* | (2010.01) |

(52) U.S. Cl.
CPC .............. *G06K 9/6262* (2013.01); *G06K 9/627* (2013.01); *G06K 9/6227* (2013.01); *G06N 99/005* (2013.01)

(58) Field of Classification Search
CPC ... G06K 9/6262; G06K 9/6227; G06K 9/627; G06K 9/6256; G06K 9/66; G06K 9/6217; G06K 9/6282; G06N 99/005; G06F 17/0256
USPC ......... 382/159, 224, 190, 100, 155, 156, 158, 382/173, 209, 305, 103, 115, 128, 157, 181, 382/201, 225, 228; 706/12, 20, 52, 46, 16, 706/10, 15, 23, 26, 55, 11, 14, 21, 25, 41, 706/45, 47, 48, 50, 60, 61, 17; 707/723, 707/748, 737, 696, 705, 745, 752, 915, 707/E17.014, E17.046, 999.003, 999.006, 707/999.104
See application file for complete search history.

(56) References Cited

U.S. PATENT DOCUMENTS

| | | | | |
|---|---|---|---|---|
| 7,949,186 B2 * | 5/2011 | Grauman | ............. | G06K 9/4671 382/159 |
| 8,107,726 B2 * | 1/2012 | Xu | ........................ | G06K 9/6256 345/619 |
| 8,732,098 B2 * | 5/2014 | Ahmad | ................. | H04L 12/585 706/12 |

OTHER PUBLICATIONS

Andrea Frome, Greg S. Corrado, Jonathon Shlens, Samy Bengio, Jeffrey Dean, Marc'Aurelio Ranzato, Tomas Mikolov, "DeViSE: A Deep Visual-Semantic Embedding Model", NIPS, 2013., pp. 1-11.*
Mensink, T., Verbeek, J., Perronnin, F., and Csurka, G., "Distance-based image classification: Generalizing to new classes at near zero cost", IEEE Transactions on Pattern Analysis and Machine Intelligence, 2013, pp. 1-14 https://staff.fnwi.uva.nl/t.e.j.mensink/publications/mensink13pami.pdf.

(Continued)

*Primary Examiner* — Sheela C Chawan
(74) *Attorney, Agent, or Firm* — Farjami & Farjami LLP

(57) ABSTRACT

There are provided systems and methods of incremental category embedding for categorization. One method including selecting one or more input categories from a plurality of input categories to be added to learned categories, determining at least one representative category from the learned categories for each input category from the one or more input categories, the at least one representative category representing the input category, and approximating the input category using the at least one representative category.

18 Claims, 6 Drawing Sheets

(56) References Cited

OTHER PUBLICATIONS

Akata, Zeynep, Perronnin, Florent, Harchaoui, Zaid, and Schmid, Cordelia., "Label-Embedding for Attribute-Based Classification", CVPR, 2013, pp. 1-9 https://hal.inria.fr/hal-00815747v1/document.

Andrea Frome, Greg S. Corrado, Jonathon Shlens, Samy Bengio, Jeffrey Dean, Marc'Aurelio Ranzato, Tomas Mikolov, "DeViSE: A Deep Visual-Semantic Embedding Model", NIPS, 2013., pp. 1-11 http://static.googleusercontent.com/media/research.google.com/en/us/pubs/archive/41473.pdf.

* cited by examiner

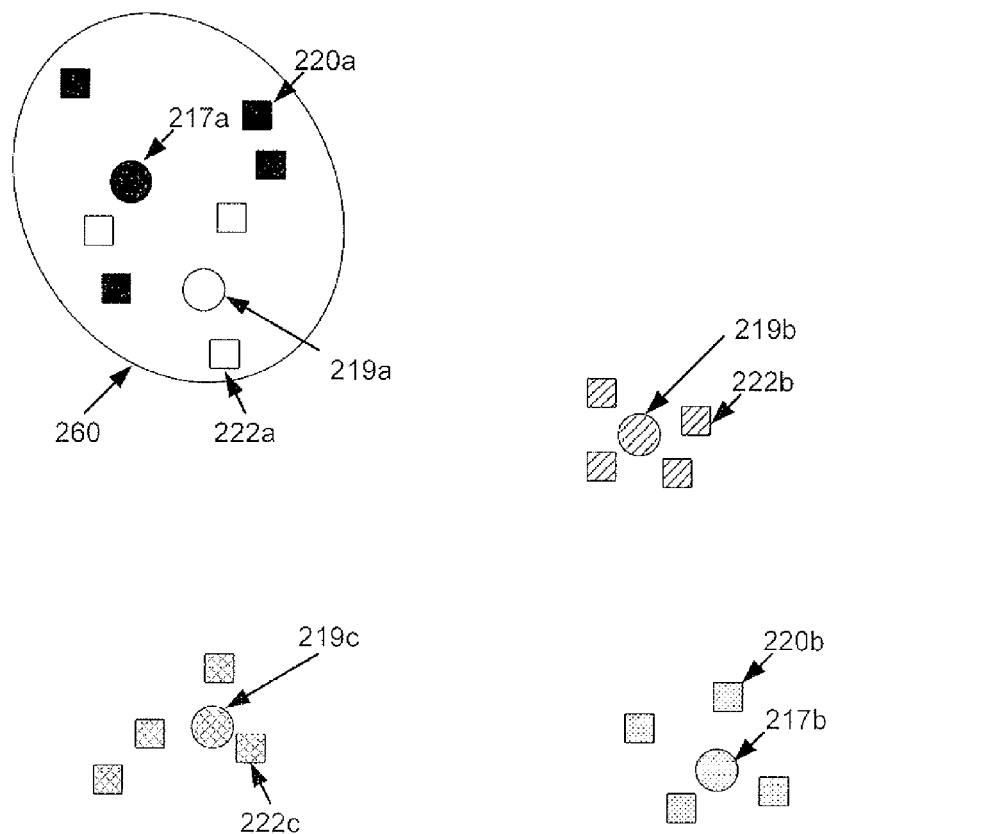

INCREMENTAL CATEGORY EMBEDDING FOR CATEGORIZATION

BACKGROUND

There are a variety of existing methods used for recognizing objects within images. When recognizing objects within images, some methods may use object categorization, which generates categories for the different objects. For example, if categorizing types of animals within images, object categorization may include different categories for lions, bears, zebras, tigers, horses, and geckos. However, there are many problems with the existing methods of object categorization. For example, the existing methods of object categorization try to randomly learn different categories without using any type of learning order. The problem with randomly learning new categories is that it is usually easier to learn new categories based on characteristics from similar categories have already been learned. For another example, the existing methods of object categorization cannot approximate an object from an image unless a category corresponding to that object has already been learned.

SUMMARY

The present disclosure is directed to incremental category embedding for categorization, substantially as shown in and/or described in connection with at least one of the figures, as set forth more completely in the claims.

BRIEF DESCRIPTION OF THE DRAWINGS

FIG. 2B presents an example of selecting a category by using the maximum loss method, according to one implementation of the present disclosure.

DETAILED DESCRIPTION

Figure 1:
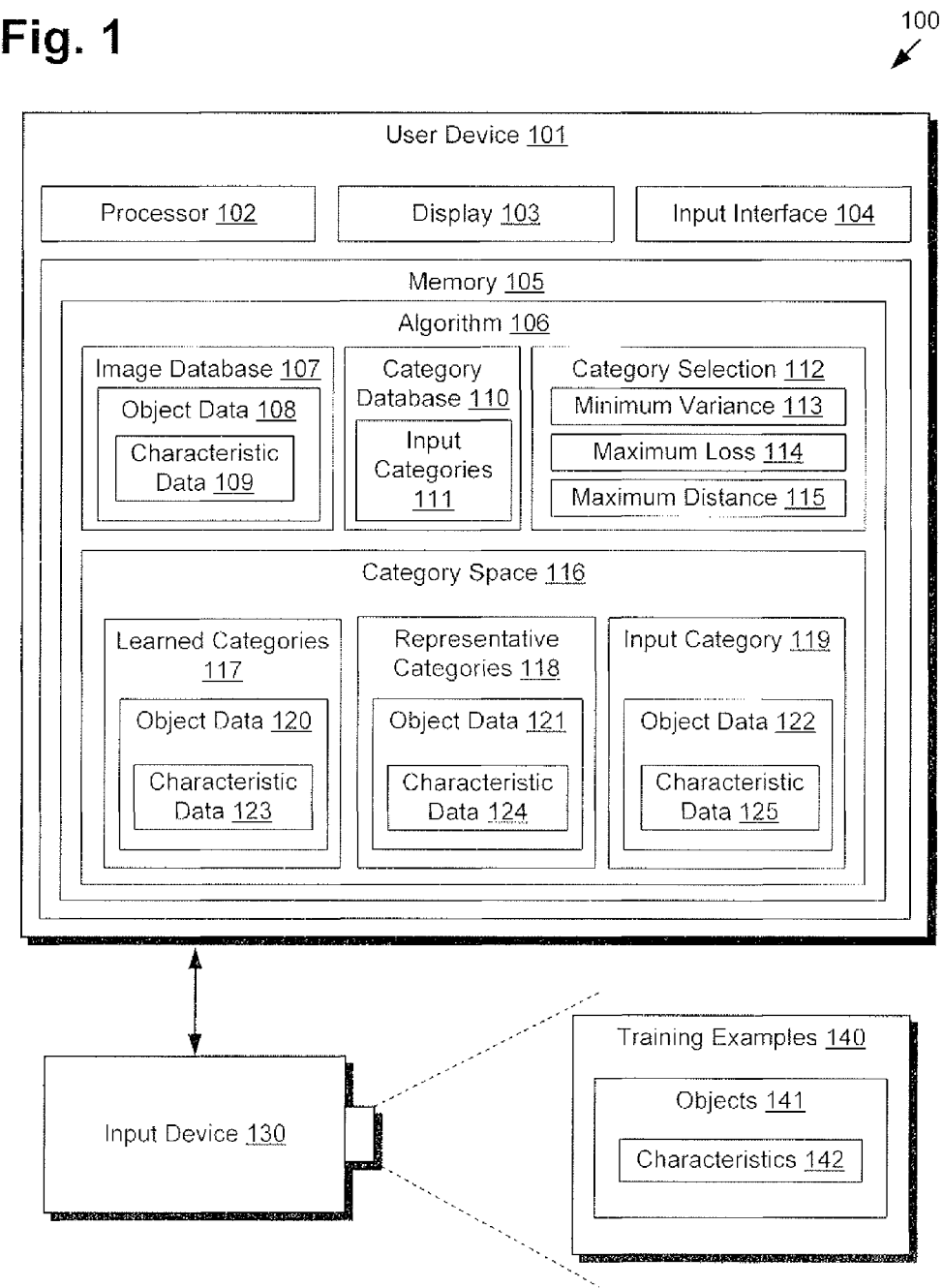
FIG. 1 presents a system for incremental category embedding for categorization, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for incremental category embedding for categorization, according to one implementation of the present disclosure. System 100 of FIG. 1 includes user device 101, input device 130, and training examples 140. User device 101 includes processor 102, display 103, input interface 104, and memory 105. Memory 105 includes algorithm 106, which includes image database 107, category database 110, category selection 112, and category space 116. Image database 107 includes object data 108, which includes characteristic data 109. Category database 110 includes input categories 111. Category selection 112 includes minimum variance 113, maximum loss 114, and maximum distance 115. Category space 116 includes learned categories 117, representative categories 118, and input category 119. Learned categories 117 include object data 120, which includes characteristic data 123. Representative categories 118 include object data 121, which includes characteristic data 124. Input category 119 includes object data 122, which includes characteristic data 125. Training examples 140 includes objects 141, which includes characteristics 142.

User device 101 may comprise a personal computer, a mobile phone, a tablet, or any other device capable of executing algorithm 106 in memory 105. As shown in FIG. 1, user device 101 includes display 103 and input interface 104. Input interface 104 may comprise, for example, a keyboard, a mouse, a game controller, a touch-screen input, a thermal and/or electrical sensor, or any other device capable of accepting user input for use with user device 101. Display 103 may comprise a liquid crystal display (LCD) screen built into user device 101. In alternative implementations of the present disclosure, display 103 may be another type of display hardware, such as cathode-ray tubes (CRT) monitors. In yet other implementations, display 103 may also be touch sensitive and may serve as input interface 104.

User device 101 further includes processor 102 and memory 105. Processor 102 may be configured to access memory 105 to store received input or to execute commands, processes, or programs stored in memory 105, such as algorithm 106. Processor 102 may correspond to a processing device, such as a microprocessor or similar hardware processing device, or a plurality of hardware devices. However, in other implementations processor 102 refers to a general processor capable of performing the functions required of user device 101. Memory 105 is a sufficient memory capable of storing commands, processes, and programs for execution by processor 102. Memory 105 may be instituted as ROM, RAM, flash memory, or any sufficient memory capable of storing a set of commands. In other implementations, memory 105 may correspond to a plurality memory types or modules.

As illustrated in FIG. 1 system 100 includes input device 130. Input device 130 may include, but is not limited to, a camera, a video recorder, a scanner, or any other device capable of capturing training examples 140 to be used with algorithm 106. It is noted that in the implementation of FIG. 1, input device 130 is separate from user device 101. In such an implementation, input device 130 may communicate with user device 101 through a physical or wireless connection. In other implementations, input device 130 may not be separate from user device 101 and may be physically attached or built into user device 101. In such implementations, processor 102 of user device 101 controls input device 130 to receive training examples 140.

Also illustrated in FIG. 1, system 100 includes training examples 140, which includes objects 141. Training examples 140 are utilized by user device 101 to both train algorithm 106 by learning new categories for objects 141 captured or illustrated in images and to test algorithm 106 by approximating objects 141 captured or illustrated in images. As such, training examples 140 may include, but are not limited to, images of different types of objects 141. Objects 141 may include people, cars, buildings or other structures, animals, animated characters, or any other real or fictional person or object that can be captured or illustrated in an image. Characteristics 142 may include the features that make up objects 141. For example, characteristics 142 may include the color, sex, height, weight, size, shape, orientation, or texture of objects 141.

It should be noted that the implementation of FIG. 1 only illustrates inputting training examples 140 into user device 101 using input device 130, however, the present disclosure is not limited to the implementation of FIG. 1. In other implementations, training examples 140 may be input into user device 101 using other methods. For example, training examples 140 may be downloaded and stored on user device 101 from the Internet. For another example, training examples 140 may be downloaded and stored on user device 101 from an external database of training examples 140, such as from another user device or storage device.

Also illustrated in FIG. 1, user device 101 includes algorithm 106. User device 101 utilizes algorithm 106 to either recognize the category that an object depicted in an image belongs to or to approximate an object in an image when the object does not already have a category in the category space. As such, algorithm 106 includes image database 107, which includes a database of all of the images captured by input device 130, such as training examples 140. For example, user device 101 may capture training examples 140 with objects 141 that include characteristics 142. User device 101 may then store training examples 140 in image database 107, wherein images in image database 107 include object data 108, which includes characteristic data 109. Object data 108 may include data corresponding to objects 141 from training examples 140. As such, characteristic data 109 may include data that is computed from the images that corresponds to characteristics 142 of objects 141.

For example, user device 101 may utilize input device 130 to capture one of training examples 140, where the one of training examples 140 includes an image of a zebra as one of objects 141. In such an example, user device 101 may store the image of the zebra in image database 107. Object data 108 for the image of the zebra may then include data specifying that the object in the image includes a zebra. Characteristic data 109 for the zebra may then include data specifying the size of the zebra, the shape of the zebra, and the colors of the zebra.

It should be noted that each of object data 120, object data 121, and object data 122 are similar to object data 108, and each of characteristic data 123, characteristic data 124, and characteristic data 125 are similar to characteristic data 109. For example, object data 120 may include data corresponding to objects within learned categories 117 that each includes characteristic data 123. For a second example, object data 121 may include data corresponding to objects within representative categories 118 that each includes characteristic data 124. Finally, for a third example, object data 122 may include data corresponding to objects within input category 119 that each includes characteristic data 125. Each of learned categories 117, representative categories 118, and input category 119 will be explained in greater detail below.

Also illustrated in FIG. 1, algorithm 106 of user device 101 includes category database 110. Category database 110 may include all of the categories that are used for object categorization, where object categorization places all of the objects depicted in images into different categories based on what the objects are. For example, each category within category database 110 may include, but are not limited to, a different type of person, car, building or other structure, animal, animated character, or any other real or fictional person or object that can be placed into a specific category. For example, categories for animals within category database may include a tiger category, a lion category, a horse category, a gecko category, a whale category, a polar bear category, a brown bear category, a zebra category, and any other categories needed to recognize animals within images. Input categories 111 of category database 110 may thus include each of the categories that are going to be embedded into category space 116 so that algorithm 106 can better learn different categories for object recognition, as will be explained in more detail below.

Also illustrated in FIG. 1, algorithm 106 of user device 101 includes category selection 112. Category selection 112 may include methods used by algorithm 106 to select the order in which input categories 111 will be learned, where categories are selected using methods that maximize recognition accuracy for algorithm 106. For example, and as illustrated in FIG. 1, category selection 112 includes three different methods for selecting new categories to be learned by algorithm 106, which include minimum variance 113, maximum loss 114, and maximum distance 115. Each of the methods utilized for selecting the order of categories to be learned by algorithm 106 from input categories 111 will be described in better detail with regard to FIGS. 2A-2C.

Also illustrated in FIG. 1, algorithm 106 of user device 101 includes category space 116. Category space 116 may include a discriminative embedding space for categorization that embeds both data points and categories using discriminative learning methods. The data points embedded within category space 116 correspond to objects 141 from training examples 140 that have been learned by algorithm 106, such as object data 120, object data 121, and object data 122. The categories embedded into category space 116 correspond to the different categories learned by algorithm 106 using objects 141 of training examples 140, such as learned categories 117, representative categories 118, and input category 119.

Learned categories 117 may include each of the categories from category database 110 that have been learned by algorithm 106 and embedded into category space 116. For example, multiple training examples 140 that include objects 141 corresponding to object data 120 may have utilized by algorithm 106 to embed learned categories 117 into category space 116. In such an example, object data 120 would be separated into learned categories 117 based on what category from learned categories 117 object data 120 belonged in. For example, if learned categories 117 included categories of animals, object data of lions from object data 140 would be placed in the lion category and object data of horses from object data 140 would be placed in the horse category.

Representative categories 118 may include the categories from learned categories 117 that will be utilized by algorithm 106 to approximate input category 119. For example, in one implementation, representative categories 118 are selected from learned categories 117 based on how similar representative categories 118 are to input category 119, where a category from learned categories 117 is similar to input category 119 when it is close to input category 119 in category space 116. As such, input category 119 includes the category selected from input categories 111 by algorithm 106 to learn next and embed in category space 116. In one implementation, categories are selected by algorithm 106 from input categories 111 one at a time to be input category 119. In such an implementation, algorithm 106 learns input category 119 and embeds input category 119 into category space 116 before selecting a new category from input categories 111.

For example, if algorithm 106 is trying to learn categories for animals so that algorithm 106 can group images of animals into types of animals, learned categories 117 may include a tiger category, a lion category, a horse category, and a gecko category, each of which has already been learned by algorithm 106 and embedded into category space 116. In such an example, if algorithm 106 is now trying to learn a new zebra category, which would correspond to input category 119, algorithm 106 first selects representative categories 118 from learned categories 117 that best represent the zebra category. As such, algorithm 106 may select the tiger category, the lion category, and the horse category as representative categories 118. Algorithm 106 would then learn the zebra category using representative categories 118 by approximating the zebra category as the horse category plus the tiger category and minus the lion category.

In such an example, after learning the zebra category, algorithm 106 may embed the zebra category in category space 116 along with the tiger category, the lion category, the horse category, and the gecko category. By embedding the zebra category in category space 116 once the zebra category has been learned, algorithm 106 is now able to use the zebra category to lean new categories or to improve on object recognition of images. As such, the recognition capabilities of algorithm 106 improve each time a new category is learned and embedded into category space 116.

It should be noted that in one implementation, when embedding learned categories 117 into category space 116, algorithm 106 may utilize a large margin embeddings (LME) method. In such an implementation, algorithm 106 introduces max margin constraints between the object data and categories embeddings, such that the object data embedding is closer to its correct category embedding than to other category embeddings by a large margin. For example, each type of object data 120 that belongs to a learned category from learned categories 117 would be closer to that learned category than to the other learned categories from learned categories 117.

It should further be noted that when learning input category 119, algorithm 106 may further input additional training examples 140 to better approximate input category 119. For example, and using the example above where algorithm 106 is trying to learn categories for types of animals, algorithm 106 may use a tiger category, a lion category, and a horse category as representative categories 118 to approximate a zebra category, where the zebra category corresponds to input category 119. In such an example, algorithm 106 may further receive additional training examples 140 that include images of zebras as objects 141, where the additional training examples 140 are labeled as zebras. Algorithm 106 may then utilize the additional training examples 140 to better approximate and learn the zebra category.

It should further be noted that besides just learning new categories, algorithm 106 may further be utilized to approximate objects 141 within training examples 140 when category space 116 does not already include a learned category for the object in category space 116. For example, and using the example above where algorithm 106 includes learned categories 117 that correspond to a tiger category, a lion category, a horse category, and a gecko category, algorithm 106 may receive an image of a zebra as one of training examples 140. In such an example, algorithm 106 may approximate the image includes a zebra by first determining representative categories 118 from learned categories 117, such as the tiger category, the lion category, and the horse category. Algorithm 106 may then approximate that the image is of a zebra by using representative categories 118. For example, algorithm 106 may approximate the zebra as a horse plus a tiger and minus a lion.

It should further be noted that algorithm 106 does not need to learn all of input categories 111 at one time. For example, algorithm 106 may be used by a user to learn only a few of input categories 111 at a single point in time. In such an example, the user may then use algorithm 106 to learn new categories from input categories 111 at a later point in time. For example, if input categories 111 included fifty different categories, algorithm 106 may be used to only learn thirty of the fifty categories in a single day. In such an example, at a later point in time, such as a year later, algorithm 106 may be used to learn the remaining twenty categories.

It should further be noted that the implementation of FIG. 1 only illustrates algorithm 106 being used on objects within images, however, the present disclosure is not limited to the implementation of FIG. 1. For example, in other implementations, algorithm 106 may be utilized to categorize other forms of data, such as, but not limited to, sounds and text. In such implementations, user device 101 may receive the data using other input devices, such as a microphone.

Finally, it should be noted that system 100 may be used to learn a categorization model that can subsequently be used to categorize a previously unseen entity, such as an image that includes an object, as belonging to or containing a pattern of particular category (e.g., object class) that the categorization model was trained to recognize.

Figure 2A:
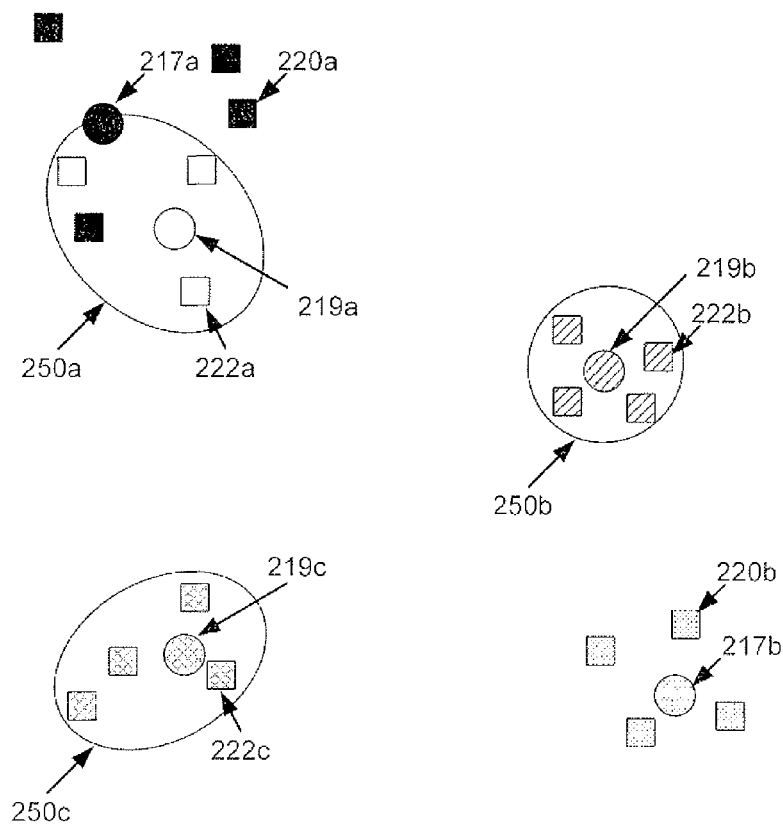
FIG. 2A presents an example of selecting a category by using the minimum variance method, according to one implementation of the present disclosure.

FIG. 2A presents an example of selecting a category by using the minimum variance method, according to one implementation of the present disclosure. Minimum variance 213 of FIG. 2A includes learned category 217a and learned category 217b, collectively referred to as learned categories 217, input category 219a, input category 219b, and input category 219c, collectively referred to as input categories 219, object data 220a and object data 220b, collectively referred to as object data 220, and object data 222a, object data 222b, and object data 222c, collectively referred to as object data 222. Minimum variance 213 further includes selected category embedding 250a, selected category embedding 250b, and selected category embedding 250c, collected referred to as selected category embeddings 250.

With respect to FIG. 2A, it should be noted that minimum variance 213, learned categories 217, each of input categories 219, object data 220, and object data 222 correspond respectively to minimum variance 113, learned categories 117, input category 119, object data 120, and object data 122 from FIG. 1. It should further be noted that only one object data 220a, object data 220h, object data 222a, object data 222b, and object data 222c are labeled in FIG. 2A for clarity purposes even though there are numerous instances of each of object data 220a, object data 220b, object data 222a, object data 222b, and object data 222c.

Minimum variance 213 method of selecting categories for incremental category embedding selects the category to be learned next based on which category has a large number of training examples that form a coherent cluster, i.e., a minimum variance for the large number of training examples. As such, an algorithm may select the next category to be learned after determining how many training examples each input category has and the variance of those training example. For example, and using FIG. 1 algorithm 106 may select one of input categories 111 from category database 110 to be input category 119 based on the number of training examples and the variance of those training examples for each of input categories 111.

As illustrated in FIG. 2A, the algorithm may select one of input categories 219 as the next input category to be learned and embedded in the category space, where each of input categories 219 includes object data 222. Input category 219a includes three object data 222a with a large variance, as illustrated by selected category embedding 250a. Input category 219b includes four object data 222b with a small variance, as illustrated by selected category embedding 250b. Finally, input category 219c includes four object data 222c with a large variance, as illustrated by selected category embedding 250c. As such, an algorithm, such as algorithm 106 from FIG. 1, would select input category 219b as the next input category to learn since input category 219b includes the most object data 222b, which is equal to object data 222c of input category 219c, however, input category 219b includes a small variance for object data 222b.

FIG. 2B presents an example of selecting a category by using the maximum loss method, according to one implementation of the present disclosure. Maximum loss 214 of FIG. 2B includes learned category 217a and learned category 217b, collectively referred to as learned categories 217, input category 219a, input category 219b, and input category 219c, collectively referred to as input categories 219, object data 220a and object data 220b, collectively referred to as object data 220, and object data 222a, object data 222b, and object data 222c, collectively referred to as object data 222. Maximum loss 214 further includes selected category embedding 260.

With respect to FIG. 2B, it should be noted that maximum loss 214, learned categories 217, each of input categories 219, object data 220, and object data 222 correspond respectively to maximum loss 114, learned categories 117, input category 119, object data 120, and object data 122 from FIG. 1. It should further be noted that only one object data 220a, object data 220b, object data 222a, object data 222b, and object data 222c are labeled in FIG. 2B for clarity purposes even though there are numerous instances of each of object data 220a, object data 220b, object data 222a, object data 222b, and object data 222c.

Maximum loss 214 method of selecting categories for incremental category embedding selects the category to be learned next based on which category has the maximum loss. The loss of a category corresponds to how interrelated the category is with the already learned categories in the category space, where categories are interrelated when they are similar to each other based on the training examples of the two categories. For example, algorithm 106 may select one of input categories 111 from category database 110 to be input category 119 based on how interrelated each of input categories 111 is with learned categories 117.

As illustrated in FIG. 2B, the algorithm may select one of input categories 219 as the next input category to be learned and embedded in the category space, where each of input categories 219 includes object data 222. Input category 219a includes object data 222a, which is interrelated with object data 220a of learned category 217a, as illustrated by selected category embedding 260. Input category 219b includes object data 222b, which is not interrelated with either of object data 220a of learned category 217a or object data 220b of learned category 217b. Finally, input category 219c includes object data 222c, which is not interrelated with either of object data 220a of learned category 217a or object data 220b of learned category 217b. As such, an algorithm, such as algorithm 106 from FIG. 1, would select input category 219a as the next category to learn since input category 219a is more interrelated with learned categories 217 than either of input category 219b and input category 219c.

Figure 2C:
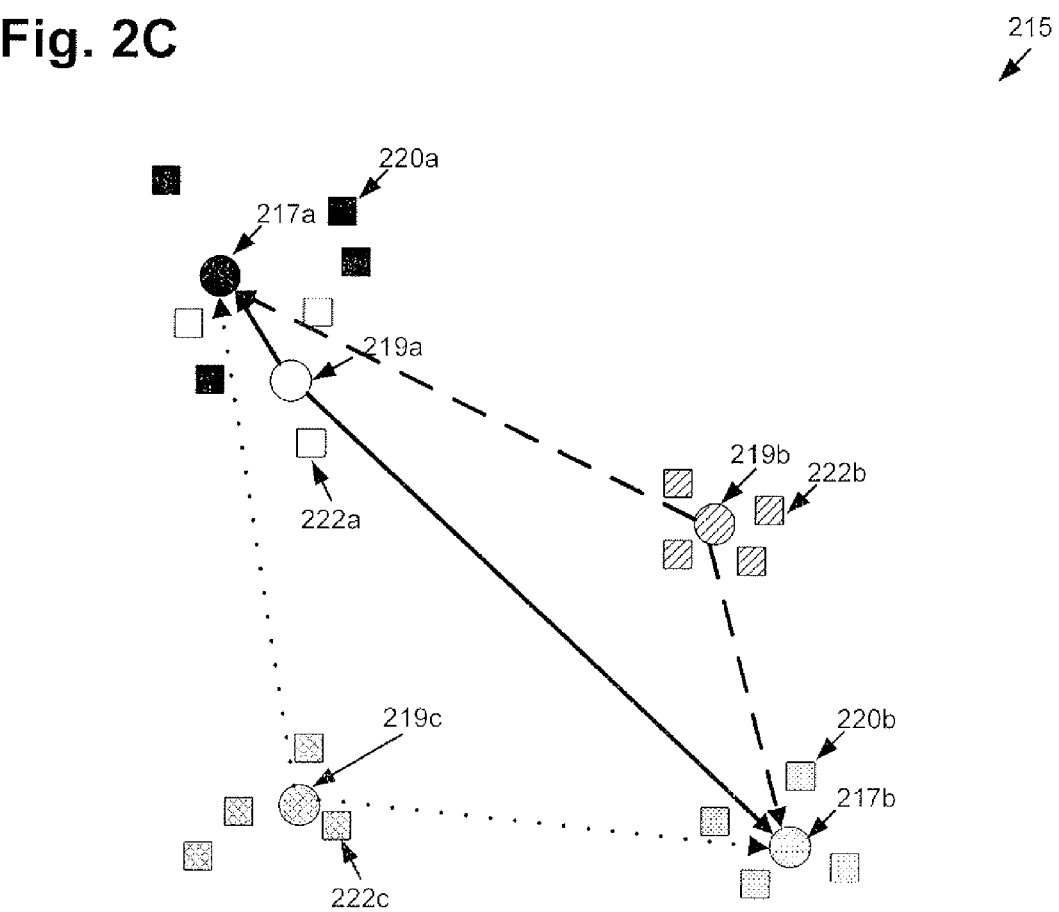
FIG. 2C presents an example of selecting a category by using the maximum distance method, according to one implementation of the present disclosure.

FIG. 2C presents an example of selecting a category by using the maximum distance method, according to one implementation of the present disclosure. Maximum distance 215 of FIG. 2C learned category 217a and learned category 217b, collectively referred to as learned categories 217, input category 219a, input category 219b, and input category 219c, collectively referred to as input categories 219, object data 220a and object data 220b, collectively referred to as object data 220, and object data 222a, object data 222b, and object data 222c, collectively referred to as object data 222. Also illustrated in FIG. 2C are distance measurements for input category 219a (represented by solid arrows), distance measurements for input category 219b (represented by dashed arrows), and distance measurements for input category 219c (represented by dotted arrows).

With respect to FIG. 2C, it should be noted that maximum distance 215, learned categories 217, each of input categories 219, object data 220, and object data 222 correspond respectively to maximum distance 115, learned categories 117, input category 119, object data 120, and object data 122 from FIG. 1. It should further be noted that only one object data 220a, object data 220b, object data 222a, object data 222b, and object data 222c are labeled in FIG. 2C for clarity purposes even though there are numerous instances of each of object data 220a, object data 220b, object data 222a, object data 222b, and object data 222c.

Maximum distance 215 method for selecting categories for incremental category embedding selects the category to be learned next based on which category is the farthest from the learned categories in the category space. Categories that are least similar to the learned categories are farther from to the learned categories than categories that are similar to the learned categories. For example, and using FIG. 1, algorithm 106 may select one of input categories 111 from category database 110 to be input category 119 based on how far each of input categories 111 is from learned categories 117. In such an example, the selected category from input categories 111 is the category that is farthest from, and thus least similar to, learned categories 117.

As illustrated in FIG. 2C, the algorithm may select one of input categories 219 as the next input category to be learned and embedded in the category space, where each of input categories 219 include object data 222. Input category 219a is close to learned category 217a and pretty far from learned category 217b, as illustrated by the solid arrows. Input category 219b is far from learned category 217a and pretty close to learned category 217b, as illustrated by the dashed arrows. Finally, input category 219c is far from learned category 217a and far from learned category 217b, as illustrated by the dotted arrows. As such, an algorithm, such as algorithm 106 from FIG. 1, would select input category 219c as the next category to learn since input category 219c is the farthest away from learned categories 217.

Figure 3:
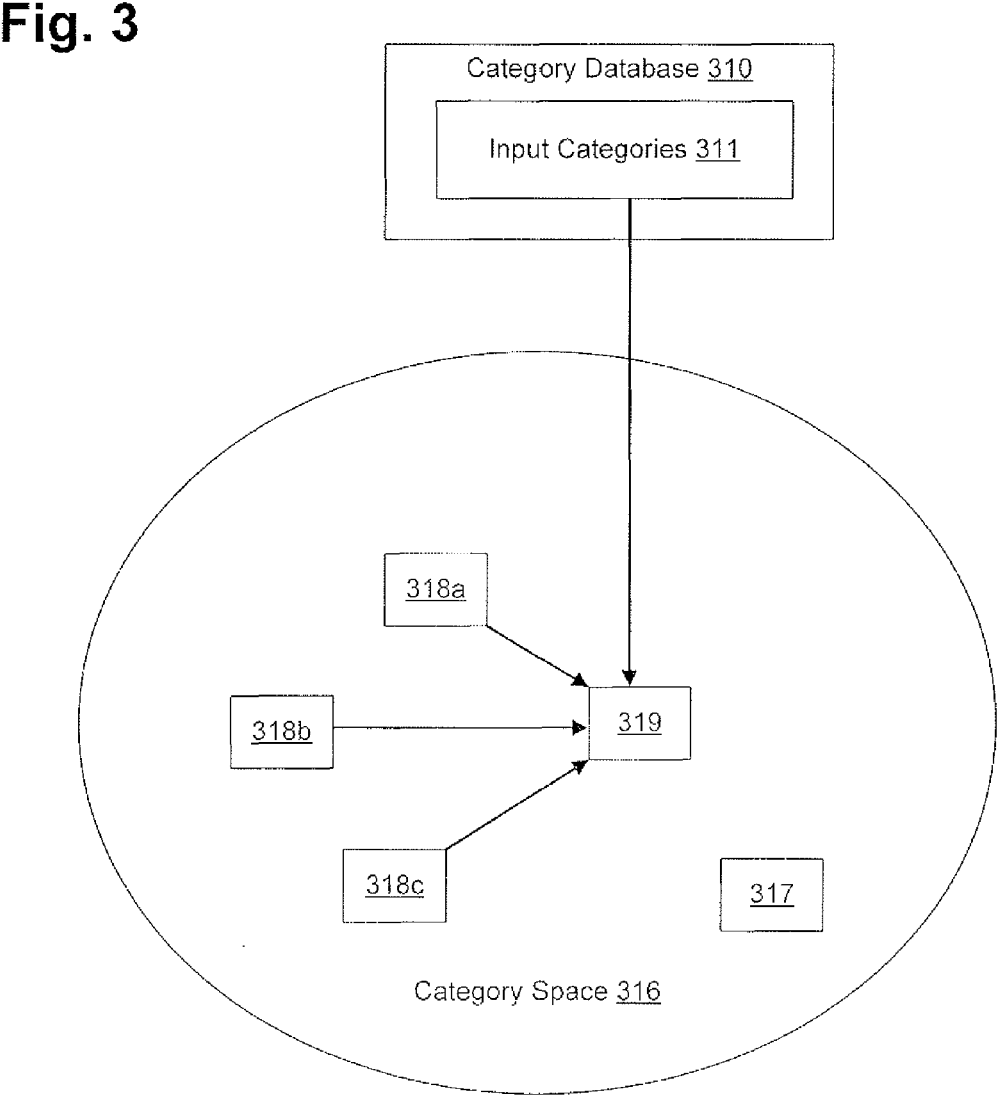
FIG. 3 presents an example of learning a new category by utilizing representative categories, according to one implementation of the present disclosure.

FIG. 3 presents an example of learning a new category by utilizing representative categories, according to one implementation of the present disclosure. FIG. 3 includes category database 310 and category space 316. Category database 310 includes input categories 311. Category space 316 includes learned category 317 and input category 319. Category space 316 further includes learned category 318a, learned category 318b, and learned category 318c, collectively referred to as learned categories 318. With respect to FIG. 3, it should be noted that category database 310, input categories 311, category space 316, learned category 317, representative categories 318, and input category 319 correspond respectively to category database 110, input categories 111, one of learned categories 117, representative categories 118, and input category 119 from FIG. 1.

As illustrated in FIG. 3, an algorithm, such as algorithm 106 from FIG. 1, has selected input category 319 to be the next category to learn from input categories 311. As discussed above, category space 316 may include a discriminative embedding space for categorization that embeds both data points and categories using discriminative learning methods. As such, the algorithm may be embedding the data points and the category for input category 319 into category space 316.

Also illustrated in FIG. 3, the algorithm has already learned and embedded four different categories into category space 316, learned category 317 and representative categories 318 (which are learned categories that have been selected to represent input category 319). From the embedded categories, the algorithm has determined representative categories 318 will be used to represent input category 319. For example, the algorithm may have determine that representative categories 318 are close to, and thus similar to, input category 319 in category space 316. As illustrated in FIG. 3, each of representative categories 318 are being used to represent input category 319, as shown by the solid arrows.

For example, and using the example above where the algorithm is trying to learn categories for animals so that the algorithm can group images of animals into types of animals, learned category 317 may include a gecko category, representative category 318a may include a tiger category, representative category 318b may include a lion category, representative category 318c may include a horse category, and input category 319 may include a zebra category. In such an example, the algorithm may then use representative categories 318 to approximate input category 319, such that the zebra category is approximately the horse category plus the tiger category and minus the lion category.

In one implementation, when approximating input category 319 from representative categories 318, the algorithm may utilize a linear combination of representative categories 318 to approximate input category 319. However, in other implementations, the algorithm may utilize other methods for approximating input category 319 from representative categories 318. Furthermore, in one implementation, when embedding input category 319 in category space 316, the algorithm may regularize the embedding of input category 319 to be close to a combination of the embeddings for representative categories 318 in category space 316.

Figure 4:
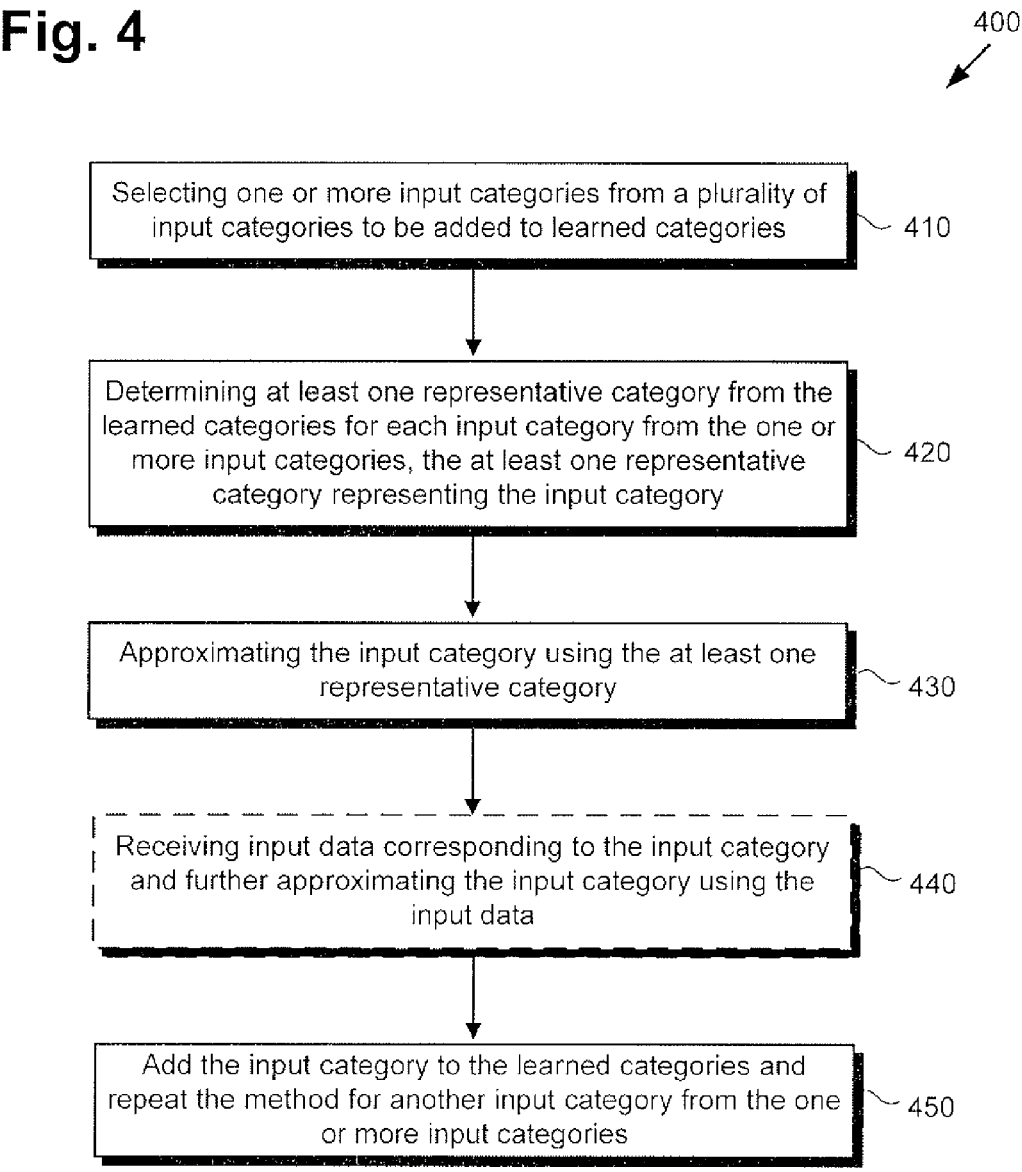
FIG. 4 shows a flowchart illustrating a method for incremental category embedding for categorization, according to one implementation of the present disclosure.

FIG. 4 shows a flowchart illustrating a method for incremental category embedding for categorization, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIG. 1, the disclosed inventive concepts are not intended to be limited by specific features shown and described with respect to FIG. 1. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 includes selecting one or more input categories from a plurality of input categories to be added to learned categories (410). For example, processor 102 of user device 101 may execute algorithm 106 to select at least one input category 119 from input categories 111 to be added to learned categories 117. As discussed above, input category 119 is the next category to be learned by algorithm 106 and embedded in category space 116. Algorithm 106 may select input category 119 using the three methods from category selection 112, which include minimum variance 113, maximum loss 114, and maximum distance 115.

Flowchart 400 also includes determining at least one representative category from the learned categories for each input category from the one or more input categories, the at least one representative category representing the input category (420). For example, processor 102 of user device 101 may execute algorithm 106 to select representative categories 118 from learned categories 117 for each input category 119 from the at least one input category 119 selected, where representative categories 118 represent input category 119. As discussed above, representative categories 118 may be selected based on how closely they are embedded in category space 116 to input category 119.

Flowchart 400 also includes approximating the input category using the at least one representative category (430). For example, processor 102 of user device 101 may execute algorithm 106 to approximate input category 119 using representative categories 118. As discussed above, algorithm 106 may use a linear combination of representative categories 118 to approximate input category 119.

Optionally, flowchart 400 may also include receiving input data corresponding to the input category and further approximating the input category using the input data (440). For example, processor 102 of user device 101 may execute algorithm 106 to receive additional object data 122 corresponding to input category 119 and further approximate input category 119 using the additional object data 122. As discussed above, additional object data 122 may be received from labeled training examples 140 corresponding to input category 119.

Flowchart 400 also includes adding the input category to the learned categories and repeating the method for another input category from the one or more input categories (450). For example, processor 102 of user device 101 may execute algorithm 106 to add input category 119 approximated above to learned categories 117, and repeat the method for another input category from input categories 111. As discussed above, adding input category 119 to learned categories 117 may include embedding input category 119 in category space 116. After embedding input category 119 in category space 116, algorithm 106 may utilize input category 116 along with the already learned categories 117 to better learn new categories or approximate objects in images. For example, algorithm 106 may use input category 119 to better learn the another input category that is selected from input categories 111.

It should further be noted that in one implementation, algorithm 106 may utilize category space 116 to approximate objects from images that do not already include a learned category embedded within category space 116. For example, processor 102 of user device 101 may execute algorithm 106 to approximate an object from an image that does not already include one of learned categories 117 embedded in category space 116. In such an example, algorithm 106 will determine representative categories 118 from learned categories 117 and approximate the object using the determined representative categories 118.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a memory storing learned categories, each of the learned categories including learned data; and
a processor configured to:
select one or more input categories from a plurality of input categories to be added to the learned categories;
determine at least one representative category from the learned categories for each input category from the one or more input categories, the at least one representative category representing the input category, wherein the at least one representative category includes a category that is similar to the input category based on the learned data;
approximate the input category using the at least one representative category to create an approximate input category, and
add the approximate input category to the learned categories.

2. The system of claim 1, wherein to select the one or more input categories to be added to the learned categories, the processor is configured to select a minimum variance category, the minimum variance category including a category from the plurality of input categories that includes minimum variances between input data.

3. The system of claim 1, wherein to select the one or more input categories to be added to the learned categories, the processor is configured to select a maximum loss category, the maximum loss category including a category from the plurality of input categories that includes input data similar to the learned data of at least one of the learned categories.

4. The system of claim 1, wherein to select the one or more input categories to be added to the learned categories, the processor is configured to select a maximum distance category, the maximum distance category including a category from the plurality of input categories that includes input data farthest away from the learned data of each of the learned categories.

5. The system of claim 1, wherein the at least one representative category includes two representative categories, and wherein to approximate the input category the processor is configured to utilize relationships between the two representative categories to approximate the input category.

6. The system of claim 1, wherein the processor is further configured to:
receive input data corresponding to the input category;
approximate the input category using the at least one representative category and the input data to create a second approximate input category, and
add the second approximate input category to the learned categories.

7. The system of claim 1 further comprising a capturing device, wherein the processor is further configured to:
capture a new image including an object using the capturing device;
determine another at least one representative category from the learned categories; and
approximate an identity of the object using the another at least one representative category.

8. The system of claim 1, wherein the learned categories including the learned data are embedded in a discriminate embedding space, and wherein the input category is embedded in the discriminate embedding space with the learned categories including the learned data.

9. The system of claim 1, wherein the learned data of the learned categories correspond to objects within images.

10. A method for incrementally embedding categories for categorization, the method comprising:
selecting one or more input categories from a plurality of input categories to be added to learned categories, each of the learned categories including learned data;
determining at least one representative category from the learned categories for each input category from the one or more input categories, the at least one representative category representing the input category, wherein the at least one representative category includes a category that is similar to the input category based on the learned data;
approximating the input category using the at least one representative category to create an approximate input category, and
adding the approximate input category to the learned categories.

11. The method of claim 10, wherein to select the one or more input categories to be added to the learned categories, the method comprises selecting a minimum variance category, the minimum variance category including a category from the plurality of input categories that includes minimum variances between input data.

12. The method of claim 10, wherein to select the one or more input categories to be added to the learned categories, the method comprises selecting a maximum loss category, the maximum loss category including a category from the plurality of input categories that includes input data similar to the learned data of at least one of the learned categories.

13. The method of claim 10, wherein to select the one or more input categories to be added to the learned categories, the method comprises selecting a maximum distance category, the maximum distance category including a category from the plurality of input categories that includes input data farthest away from the learned data of each of the learned categories.

14. The method of claim 10, wherein the at least one representative category includes two representative categories, and wherein to approximate the input category the method comprises utilizing relationships between the two representative categories to approximate the input category.

15. The method of claim 10 further comprising:
receiving input data corresponding to the input category;
approximating the input category using the at least one representative category and the input data to create a second approximate input category, and
adding the second approximate input category to the learned categories.

16. The method of claim 10 further comprising:
capturing a new image including an object using a capturing device;
determining another at least one representative category from the learned categories; and
approximating an identity of the object using the another at least one representative category.

17. The method of claim 10, wherein the learned categories including the learned data are embedded in a discriminate embedding space, and wherein the input category is embedded in the discriminate embedding space with the learned categories including the learned data.

18. The method of claim 10, the learned data corresponding to objects within images.

* * * * *